US008165128B2

(12) United States Patent
Sun et al.

(10) Patent No.: US 8,165,128 B2
(45) Date of Patent: Apr. 24, 2012

(54) METHOD AND SYSTEM FOR LOST PACKET CONCEALMENT IN HIGH QUALITY AUDIO STREAMING APPLICATIONS

(75) Inventors: Jianhua Sun, Hong Kong (CN); Sapna George, Singapore (SG)

(73) Assignee: STMicroelectronics Asia Pacific Pte. Ltd. (SG), Singapore (SG)

( * ) Notice: Subject to any disclaimer, the term of this patent is extended or adjusted under 35 U.S.C. 154(b) by 1006 days.

(21) Appl. No.: 11/329,382

(22) Filed: Jan. 10, 2006

(65) Prior Publication Data

US 2006/0184861 A1 Aug. 17, 2006

(30) Foreign Application Priority Data

Jan. 20, 2005 (SG) ................................ 200500303-3

(51) Int. Cl.
*H04L 12/28* (2006.01)

(52) U.S. Cl. ........................................ 370/394; 714/776

(58) Field of Classification Search .................. 370/394; 714/776; 709/231

See application file for complete search history.

(56) References Cited

U.S. PATENT DOCUMENTS

| | | | | |
|---|---|---|---|---|
| 4,698,842 | A | 10/1987 | Mackie et al. | |
| 4,845,562 | A * | 7/1989 | Koslov et al. | 386/131 |
| 5,930,373 | A | 7/1999 | Shashoua et al. | |
| 6,134,330 | A | 10/2000 | De Poortere et al. | |
| 6,285,767 | B1 | 9/2001 | Klayman | |
| 2002/0133764 | A1* | 9/2002 | Wang | 714/707 |
| 2003/0135631 | A1* | 7/2003 | Li et al. | 709/231 |
| 2003/0167170 | A1* | 9/2003 | Andrsen et al. | 704/270 |
| 2004/0017811 | A1* | 1/2004 | Lam | 370/394 |
| 2005/0025222 | A1* | 2/2005 | Underbrink et al. | 375/141 |

OTHER PUBLICATIONS

Sanneck, H., et al., "A New Technique for Audio Packet Loss Concealment," Global Telecommunications Conference, 1996; Globe '96; Communications: The Key to Global Prosperity, London, UK Nov. 18-22, 1996, pp. 48-52; XP010220171; ISBN: 0-7803-3336-5.

Tan, Roland K.C.,"A Time-Scale Modification Algorithm Based on the Subband Time-Domain Technique for Broad-Band Signal Applications," Journal of the Audio Engineering Society, Audio Engineering Society, New York, NY, US, vol. 48, No. 5, May 2000, pp. 437-449; XP001043754; ISSN: 1549-4950.

Farber, et al., "Adaptive Playout Scheduling and Loss Concealment for Voice Communication Over IP Networks," IEEE Transactions on Multimedia, IEEE Service Center, Piscataway, NJ, US, vol. 5, No. 4, Dec. 2003, pp. 482-493; XP011103230; ISSN: 1520-9210.

Spleesters, et al., "On the Application of Automatic Waveform Editing for Time Warping Digital and Analog Recordings," Preprints of the Audio Engineering Convention, 96th Convention, No. 3843, Feb. 1994-Mar. 1, 1994, pp. 1-11; XP007903229; Amsterdam.

European Search Report and Written Opinion, EP 06 25 0284, dated Oct. 22, 2007.

Gan, Woon S. et al.; "Virtual Bass for Home Entertainment, Multimedia PC, Game Station and Portable Audio Systems"; IEEE Transactions on Consumer Electronics, vol. 47, No. 4, Nov. 2001, pp. 787-794.

* cited by examiner

*Primary Examiner* — Robert Wilson
*Assistant Examiner* — Wei Zhao
(74) *Attorney, Agent, or Firm* — Gardere Wynne Sewell LLP

(57) ABSTRACT

The present invention provides an audio streaming system and method for transmitting audio signals with high quality. The advantages of the present invention include easy implementation, computational efficiency, and provision of better audio quality. More particularly, the present invention provides a Multi-band Time Expansion algorithm for lost packet concealment. The Multi-band Time Expansion algorithm detects the number of continuously lost packets in an audio input signal and the correctly received packets on either side of the lost packets. Then the Multi-band Time Expansion algorithm time-expands the correctly received packets that may be from either one side or both sides of the lost packets, wherein the correctly received packets are stretched to cover the length of the lost packets. Finally the Multi-band Time Expansion algorithm overlap-adds the stretched packets so that the lost packets are concealed.

20 Claims, 6 Drawing Sheets

METHOD AND SYSTEM FOR LOST PACKET CONCEALMENT IN HIGH QUALITY AUDIO STREAMING APPLICATIONS

PRIORITY CLAIM

The present application claims priority from Singapore patent application No. 200500303-3 filed Jan. 20, 2005, the disclosure of which is hereby incorporated by reference.

FIELD OF THE INVENTION

The present invention generally relates to methods and systems for high quality audio streaming applications, and more particularly to a method and system for lost packet concealment so as to improve the quality of multimedia audio signals in high quality audio streaming applications.

BACKGROUND OF THE INVENTION

Multimedia streaming refers to continuous delivery of synchronized media data like video, audio, text, and animation. The term "streaming" is used to indicate that the data representing the various media types are provided over a network to a client computer on a real-time, as-needed basis, rather than being pre-delivered in its entirety before playback. Thus, the client computer renders streaming data as they are received from a network server, rather than waiting for an entire "file" to be delivered.

There has been a growing interest in the transmission of audio information (such as broadband multimedia) over data packet networks. In this technique, analog audio data are converted into digital data, and the digital data are encapsulated into packets suitable for transmission over a packet network, for example Internet. At the receiving end, the audio information data are extracted and presented to an output media device.

With the ever-increasing demand for transmission of vivid multimedia, streaming audio has become one of the important applications in the emerging 3G Mobile Network and Internet. A significant impediment to reliable transmission of multimedia over packet networks is packet loss. Packets may be lost for a variety of reasons. For example, congestion of routers and gateways may lead to a packet being discarded; delays in packet transmission may cause a packet to arrive too late at the receiver to be played back in real-time; or heavy loading of the workstations may result in scheduling difficulties in real-time multitasking operating systems. Moreover, impairments of communication channels such as noise, fading and network congestion, may give rise to packet loss during transmission, causing audio quality degradation. Since it is impractical to request for re-transmission of lost packet in real-time streaming applications, various methods have been proposed to reconstruct the lost packets at the receiver.

These methods include Silence Substitution, Packet Repetition, Pitch Waveform Replication, and Time Scale Modification. In Silence Substitution, lost packets are simply muted. In Packet Repetition, the previous packet is used in the place of lost packet. These two methods are primitive and cause very undesirable quality degradation, especially when the audio packet size is large. The Pitch Waveform Replication method employs a Pitch Detection Algorithm on either side of a lost packet, to find a suitable signal to cover the loss. This method is found to work better than the first two, however, it is not applicable to wideband audio where it is impossible/difficult to find the single pitch.

Time-scale modification (TSM) includes time-scale compression for speeding-up playback rate of the signal and time-scale expansion for slowing-down playback rate of the signal. TSM operates to stretch both sides or either side of the lost packet in order to cover the lost packet. One of the important steps in TSM is to find the best matched segments for overlap-and-add operation using correlation. The existing lost packet concealment technique employing Time Scale Modification uses the same segment matching parameters for the entire frequency band. These parameters are not accurate when applied to wide band signals, giving rise to more severe quality degradation in the low frequency band.

However, these existing methods are more applicable to speech communications, where the packet size is small and the bandwidth is narrow. When applied to high quality audio transmission, they normally fail to provide satisfactory results, as the packet size is larger and the frequency characteristics are more complicated.

Therefore, there is an imperative need to have a system and method for lost packet concealment so as to improve the quality of multimedia audio signals in high quality audio streaming applications. This invention satisfies this need by disclosing a Waveform Similarity Overlap-Add (WSOLA) based packet loss concealment method and system for broadband multimedia audio streaming applications. Other advantages of this invention will be apparent with reference to the detailed description.

SUMMARY OF THE INVENTION

The present invention provides an audio streaming system for transmitting audio signals with high quality. The audio streaming system comprises a receiver for receiving an input audio signal transmitted through the audio streaming system and playing back the input audio signal as an output audio signal; wherein the receiver includes an error concealment module for lost packet concealment; wherein the error concealment module includes a time-expansion unit with a Multi-band Time Expansion algorithm, a decision-making unit and a packet buffer; and wherein the Multi-band Time Expansion algorithm can perform single band time expansion and multi-band time expansion according to the instructions from the decision-making unit. In one embodiment of the present invention, the packet buffer within the receiver is operably coupled to receive a sequence of incoming packets of the input audio signal from the audio streaming system, and store the received packets. In another embodiment of the present invention, the decision-making unit is operably coupled to the packet buffer to monitor any lost packets in the received audio input signal so that it decides the appropriate time-expanding methods for lost packet concealment; wherein the decision-making process of the decision-making unit includes selecting a threshold value for using different time-expansion method; calculating a count_loss parameter for lost packets in the received input audio signal; and determining of whether the count_loss parameter is more or less than the threshold value; thereby, if the count_loss parameter is more than the threshold value, the input audio signal will be separated into two or more bands to conceal lost packets, or if the count_loss parameter is less than the threshold value, the input audio signal will be treated as a single band to conceal lost packets.

The present invention also provides the Multi-band Time Expansion algorithm for the lost packet concealment. In one embodiment of the present invention, the Multi-band Time Expansion algorithm includes detecting the number of continuously lost packets in an audio input signal; detecting the correctly received packets on either side of the lost packets; time-expanding the correctly received packets that may be from either one side or both sides of the lost packets; wherein the correctly received packets are stretched to cover the length of the lost packets; and overlap-adding the stretched packets so that the lost packets are concealed. In one aspect of the embodiment, the time expanding of the correctly received packets includes correlation search within a search window for appropriate time positions where overlapping segments are extracted from the input signal. In a further aspect of the embodiment, when the input signal is separated into two or more bands, each band goes through separate correlation search procedures and uses different sets of the appropriate time positions for time expansion. In a yet further aspect of the embodiment, the separate correlation search procedures include one or more of the followings: separate search window ranges, separate search window steps, and separate search window starting points. In another embodiment of the present invention, in the correlation search for the appropriate time positions, the values obtained in a previous time expansion process can be used as reference/starting points for a current time expansion process. In yet another embodiment of the present invention, the boundaries of overlap-added stretched packets are smoothed out by fade-out and fade-in method.

The present invention further provides a method for lost packet concealment so as to provide high quality audio signals in multimedia streaming applications. The method includes storing correctly received packets of an audio input signal in a buffer, wherein the number of buffered packets can be selected based on the amount of available memory; activating a Multi-band Time Expansion algorithm for lost packet concealment; and concealing the lost packets by executing the chosen time expansion algorithm.

One objective of the present invention is to improve the sound quality of broadband audio transmitted over error prone channels.

The advantages of the present invention include easy implementation, computational efficiency, and provision of better audio quality.

The objectives and advantages of the invention will become apparent from the following detailed description of preferred embodiments thereof in connection with the accompanying drawings.

BRIEF DESCRIPTION OF THE DRAWINGS

Preferred embodiments according to the present invention will now be described with reference to the Figures, in which like reference numerals denote like elements.

DETAILED DESCRIPTION OF THE INVENTION

The present invention may be understood more readily by reference to the following detailed description of certain embodiments of the invention.

Throughout this application, where publications are referenced, the disclosures of these publications are hereby incorporated by reference, in their entireties, into this application in order to more fully describe the state of art to which this invention pertains.

The present invention provides a system and method employing Multi-band Time Expansion for lost packet concealment in streaming audio applications. The present invention derives from the realization of the broadband characteristics of high quality audio. Thus, by separating an audio signal into two or more bands (e.g., low frequency band and high frequency band) and using different parameter settings in the Time Expansion for different bands, the lost packets can be reconstructed with less quality degradation. The present invention further provides some techniques to reduce computational power requirement, making it more feasible for practical implementation.

Figure 1:
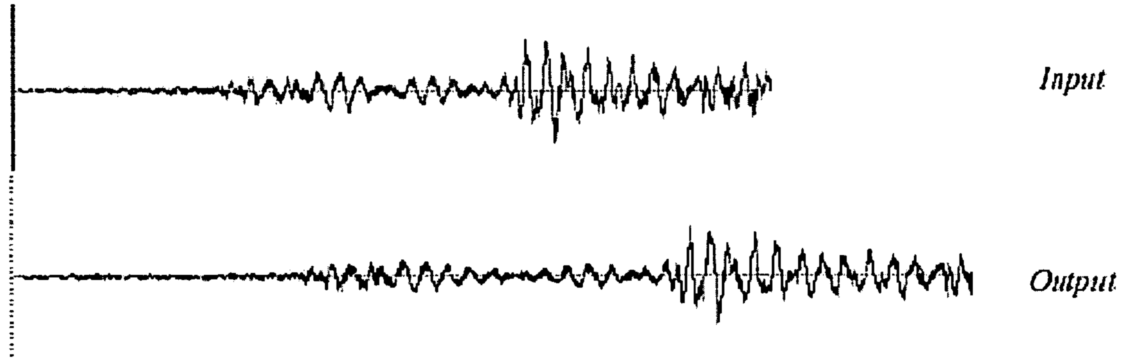
FIG. 1 shows as an example of time scale expansion the waveforms of one input audio signal and one output audio signal after time scale expansion of the input audio signal.

As discussed above, the Time Scale Modification is a process that alters audio speed/tempo, while keeping audio's pitch intact. FIG. 1 shows as an example of time scale expansion the waveforms of one input audio signal and one output audio signal after time scale expansion of the input audio signal. It is to be appreciated that the principles of the present invention will be illustrated by employing the Waveform Similarity Overlap-Add (WSOLA) algorithm, while other algorithms available for Time Scale Modification may be applicable for the present invention.

The basic principle of the WSOLA algorithm is very straightforward. The WSOLA method is based on constructing a synthetic waveform that maintains maximal local similarity to the original signal. The synthetic waveform y(n) and original waveform x(n) have maximal similarity around time instances specified by a time warping function. Simply put, the original signal is first divided into two overlapping segments. Then by altering the length of the overlapping segments, the resulting output duration is changed. Let x(n) be the input speech signal to be modified, y(n) the time-scale modified signal and $\alpha$ be the time-scaling parameter. If $\alpha$ is less than 1 then the speech signal is expanded in time. If $\alpha$ is greater than 1 then the speech signal is compressed in time.

Figure 2:
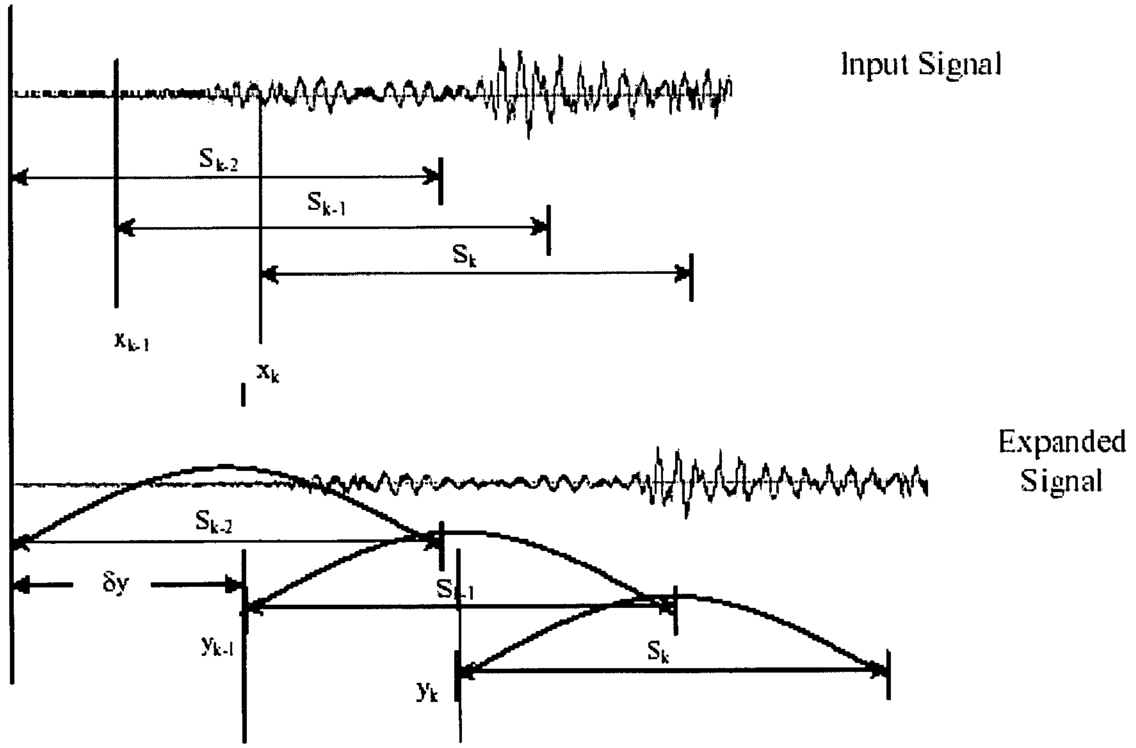
FIG. 2 illustrates the principles of WSOLA algorithm by showing the time expanding with overlapping segments.

Now referring to FIG. 2, there is provided a brief description of how these overlap-add techniques are used for time-expansion signals. As shown in FIG. 2, overlapping segments $S_k$ are extracted from the input signal at time instance $x_k$ and are superimposed with less overlap in the output at time instance $y_k$. The output is obtained by adding two half segments of length $\delta_y$. For smooth transitions from segment to segment, a Hanning window is used to weigh the two segments before the summation. Thus the output signal is given by the following equation:

$$O(n) = \sum_{k} h(n - y_k) * I(n - y_k + x_k) \tag{1}$$

wherein k is the step index and h(n) is the Hanning window coefficients, given by the following equation:

$$h(n) = \begin{cases} 1\big/2\left[1 - \cos\left(\dfrac{2\pi(n+1)}{N+1}\right)\right] & 0 \le n < N \\ 0 & \text{otherwise} \end{cases} \tag{2}$$

wherein N is the window size.

Suppose the input signal is a sine wave, so that the two overlapping segments can be represented by sin $(\bar{w}_0 t)$ and sin $(\bar{w}_0 t+\phi)$ respectively. The Overlap-Add output is then given by:

$$O(t) = a * \sin(\varpi_o t) + b * \sin(\varpi_o t + \phi)$$

$$O(t) = a * \sin(\varpi_o t) + b[\sin(\varpi_o t)\cos\phi + \cos(\varpi_o t)\sin\phi)]$$

$$O(t) = (a + b * \cos\phi) * \sin(\varpi_o t) + b\sin\phi\cos(\varpi_o t)$$

$$O(t) = \sqrt{(a + b*\cos\phi)^2 + b^2\sin^2\varphi}\left[\frac{a + b*\cos\phi}{\sqrt{(a + b*\cos\phi)^2 + b^2\sin^2\varphi}} * \sin(\varpi_o t) + \frac{b\sin\phi}{\sqrt{(a + b*\cos\phi)^2 + b^2\sin^2\varphi}} * \cos(\varpi_o t)\right] \tag{3}$$

$$O(t) = \sqrt{(a + b*\cos\phi)^2 + b^2\sin^2\varphi * \sin(\varpi_o t + \theta)}$$

wherein:

$$\theta = \cos^{-1}\left[\frac{a + b*\cos\phi}{\sqrt{(a + b*\cos\phi)^2 + b^2\sin^2\varphi}}\right]$$

As shown in the derivation above, the Overlap-Add output is now another sine wave with the same pitch. As any complicated signal can be decomposed into infinite number of sine waves, it is apparent that the output pitch is intact. It is also noted from the equation (3) that phase discontinuities arise if the two segments being superimposed are not in phase with each other. Therefore, the values $x_k$ have to be selected carefully. The appropriate positions for $x_k$ are determined by finding the maximum cross correlation within a search window.

Figure 3:
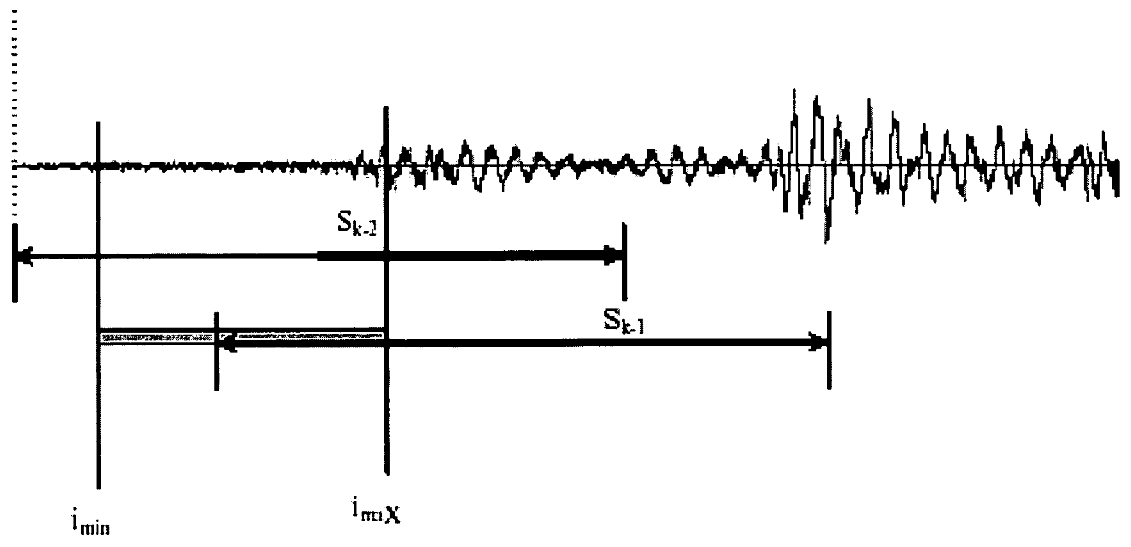
FIG. 3 illustrates the determination of positions of $x_k$ by cross correlation in the application of the WSOLA algorithm.

Now referring to FIG. 3, there is provided the determination of positions of $x_k$ by cross correlation. The cross correlation between the two half segments to be superimposed is computed. The best position for $x_k$ is located by moving $x_k$ within the search window $[i_{min}, i_{max}]$ and finding the maximum cross correlation. The cross correlation is given by the following equation:

$$C_i = \sum_{j=0}^{\delta y} I(i + j) * I(x_{k-1} + \delta y + 1) \tag{4}$$

Theoretically, the search window length has to cover at least one pitch period of the signal. However, it is difficult to determine the pitch period and normally the period is quite large for wideband audio signal. Furthermore, the search window length is also limited by the computational resource available in real time applications. Therefore, it is normally impractical to obtain the perfectly synchronized segments.

Figure 4:
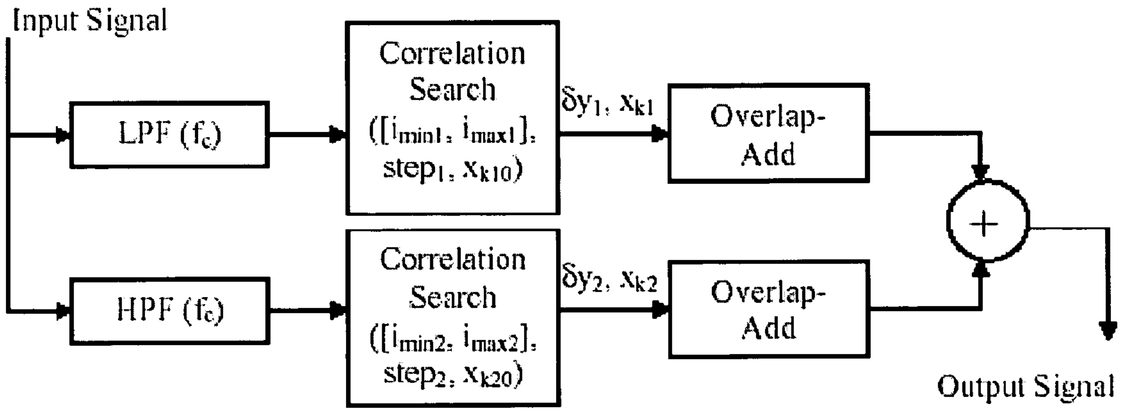
FIG. 4 illustrates the operations of multi-band time expansion in accordance with one embodiment of the present invention.

Now referring to FIG. 4, there is provided an illustration of the operations of Multi-band Time Expansion. As shown in FIG. 4, the input signal is separated into two bands by digital filtering. It is to be appreciated that the input signal may be divided into more than two bands depending on the computational constraints. The low pass filtered and high pass filtered signals go through separate correlation search procedures and different sets of best matched positions $x_k$ are used for time expansion. The Correlation Search uses different search window ranges $[i_{min}, i_{max},]$ search steps and initial values for different bands, which makes the searching procedure more efficient. The separately time expanded low band and high band are then combined to obtain the full band time expanded output. The digital filter coefficients can be easily computed with Matlab tools.

Figure 5:
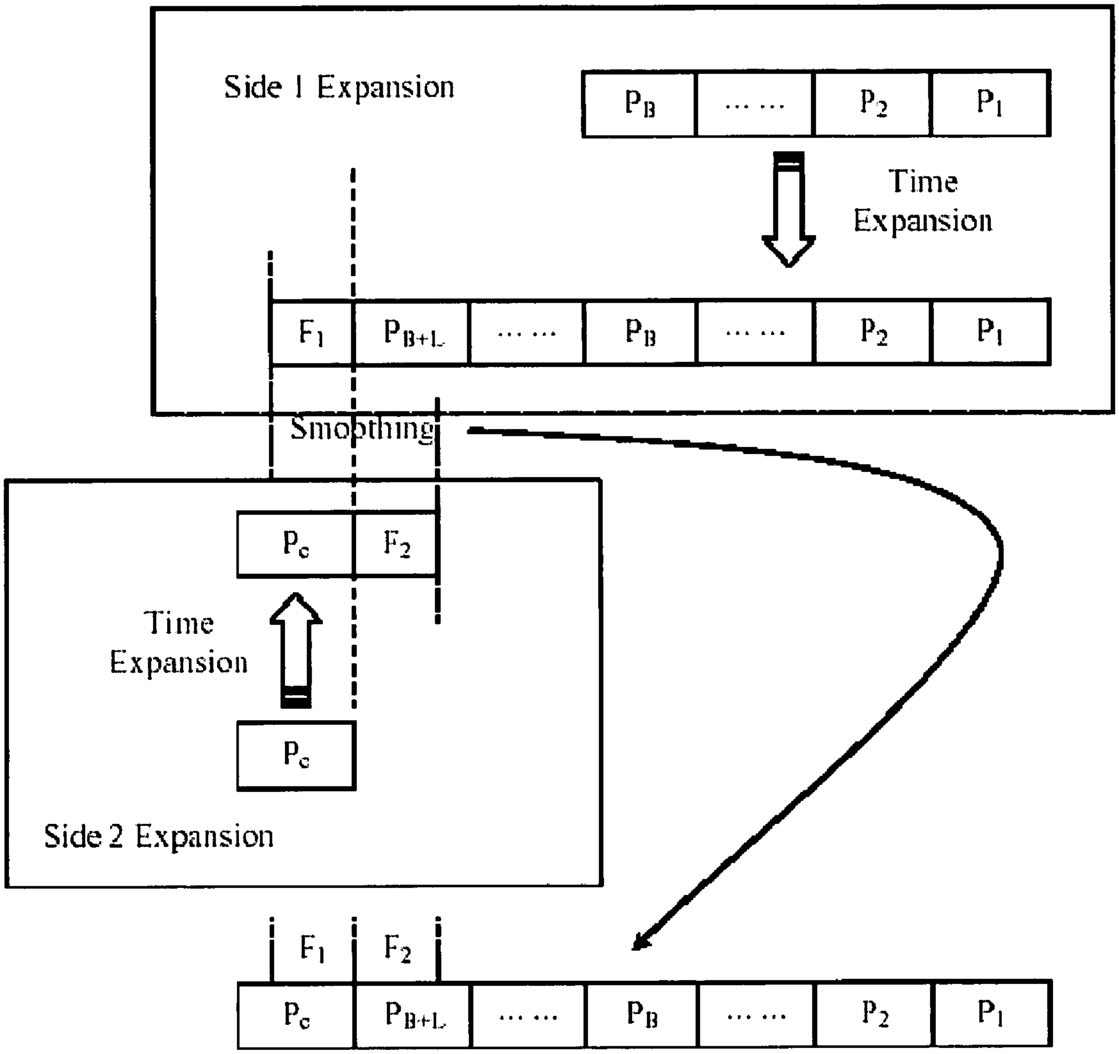
FIG. 5 illustrates the operations of lost packet concealment by time expansion through WSOLA algorithm in accordance with one embodiment of the present invention.

FIG. 5 illustrates how the Multi-band Time Expansion can be used to conceal lost packets in audio transmission. In one embodiment of the present invention, as shown in FIG. 5, a two-side time expansion method is employed. In FIG. 5, P1, P2, . . . , PB are B data packets correctly received before the lost packets and Pc is the current correctly received packet. The B packets are stretched to length of (B+L)*P+F1, where P is the packet size, L is the number of continuously lost packets and F1 is the number of additional samples to be used for smoothing operation. Similarly, the current correctly received packet Pc is stretched to the length of (P+F2), where F2 is the number of additional samples to be used for smoothing operation. These two parts are then joined together to form a data chunk of length of(B+L+1)*P, i.e., the lost L packets are concealed.

To ensure smooth transitions, Overlap Adds (OLA) are performed at all signal boundaries. OLAs are a way of smoothly combining two signals that overlap at one edge. In the region, where the signals overlap, the signals are weighted by windows and then added (mixed) together. The windows are so designed that the sum of the weights at any particular sample is equal to 1. That is, no gain or attenuation is applied to the overall sum of the signals. In addition, the windows are so designed that the signal on the left starts out at weight 1 and gradually fades out to 0, while the signal on the right starts out at weight 0 and gradually fades in to weight 1. Thus, in the region to the left of the overlap window, only the left signal is present while in the region to the right of the overlap window, only the right signal is present. In the overlap region, the signal gradually makes a transition from the signal on left to that on the right. Hanning windows are used to keep the complexity of calculating the variable length windows low, but other windows such as triangular windows can be used instead. Now returning to FIG. 5, to ensure smooth transition at the boundary of these two parts, additional (F1+F2) samples are generated in the time expansion. Samples in this overlap area of length (F1+F2) are weighed by fade-out, fade-in coefficients and summed.

Figure 6:
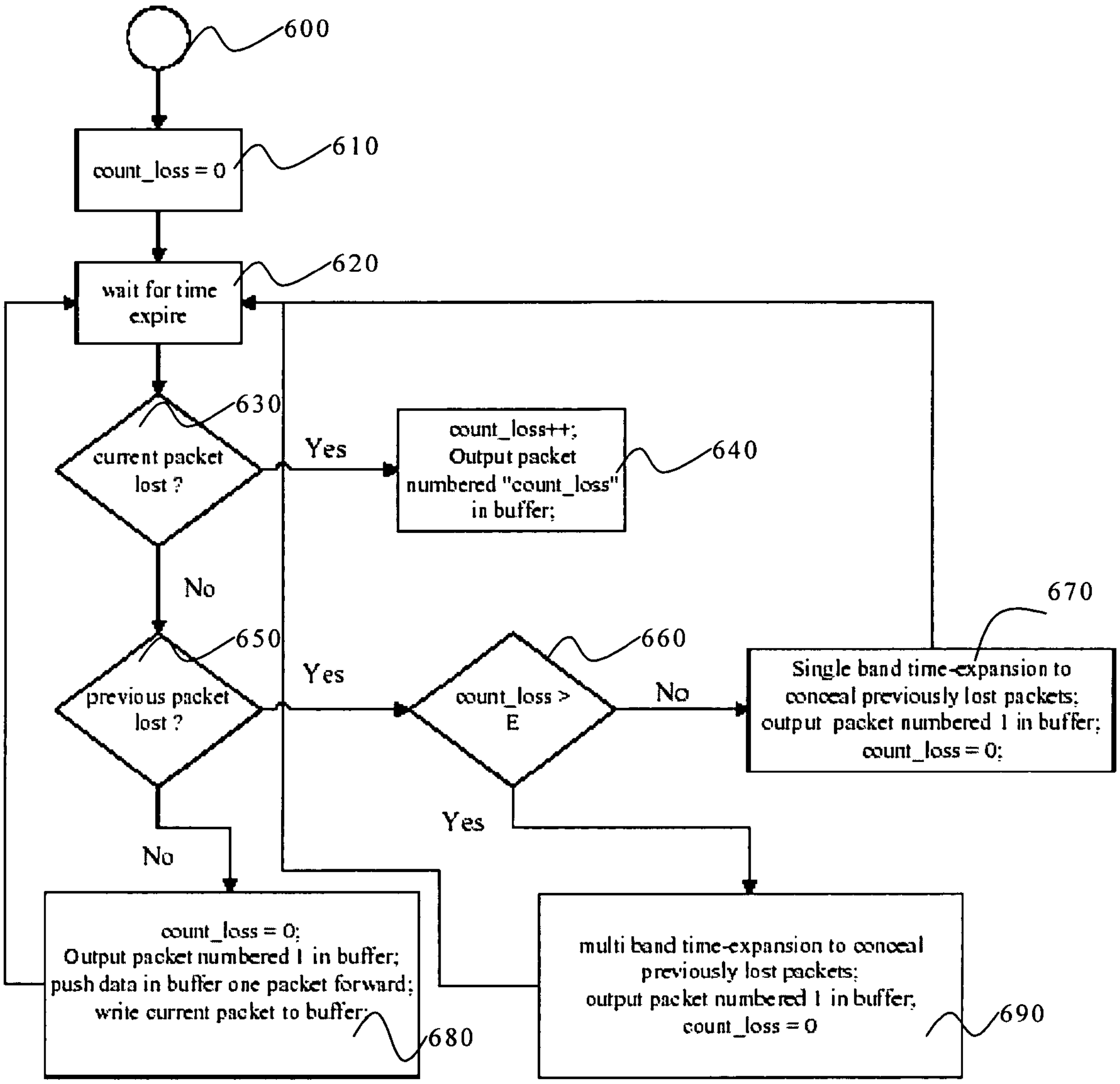
FIG. 6 is a flow-chart of decision making for lost packet concealment.

Referring now to FIG. 6, the present invention provides a decision making function to the Multi-band Time Expansion so that it can be run with low power consumption. FIG. 6 is a flow-chart of decision making for lost packet concealment. When the system starts 600 an audio signal with packets, the parameter count_loss is to count the number of continuously lost packets and it is initialized to zero at the beginning 610. Packets in the buffer are numbered 1, 2, . . . , B, with index 1 for the earliest packet. When the system waits for the time to expire for checking each batch of packets 620, it will check whether the current packet is lost or not 630. If the current packet is lost, count_loss is incremented by 1 and the packet numbered count_loss in the buffer is played 640. If the current packet is not lost, the system will continue to check whether the previous packet is lost or not 650. If the previous packet is not lost, it means that both the current packet and the previous packet are received successfully, count_loss is reset to zero, the earliest packet in the buffer is played and the current packet is appended to the buffer 680. If the previous packet is lost while the current packet is received correctly, the Multi-band Time Expansion will conceal the L previously lost packets in ways detailed in FIG. 5. Low power consumption considerations demand to use Multi-band Time Expansion only when the error rate is high. The threshold E is used to decide whether to use single-band or multi-band time expansion methods. Depending on the trade off between audio quality and power consumption, the threshold E is selected accordingly. The system will check whether the count_loss is more or less than the threshold E as selected by the user 660. If the count_loss is more than the threshold E, the input audio signal will be separated into two or more bands to conceal previously lost packets, and then the output packet is numbered 1 in buffer and the count_loss is set to (0) zero 690. If the count_loss is less than the threshold E, the input audio signal will be treated as a single band to conceal previously lost packets, and then the output packet is numbered 1 in buffer and the count_loss is set to (0) zero 670.

The present invention further provides means to save power consumption and computational constraints. For example, in the correlation search for best matched positions, the values obtained in the previous time expansion process can be used as reference/starting points for current time expansion. This helps to reduce the correlation search window, effectively bringing down the computational requirement. In addition, the parameters for one band can be used as a starting reference for the next band. For example, the final correlated point of the previous band may be used as the starting point for the search for the correlation of a new band. Moreover, it is also possible to use different search window ranges, steps and initial values in the Correlation Computation in different bands, which makes the searching procedure more efficient.

Figure 7:
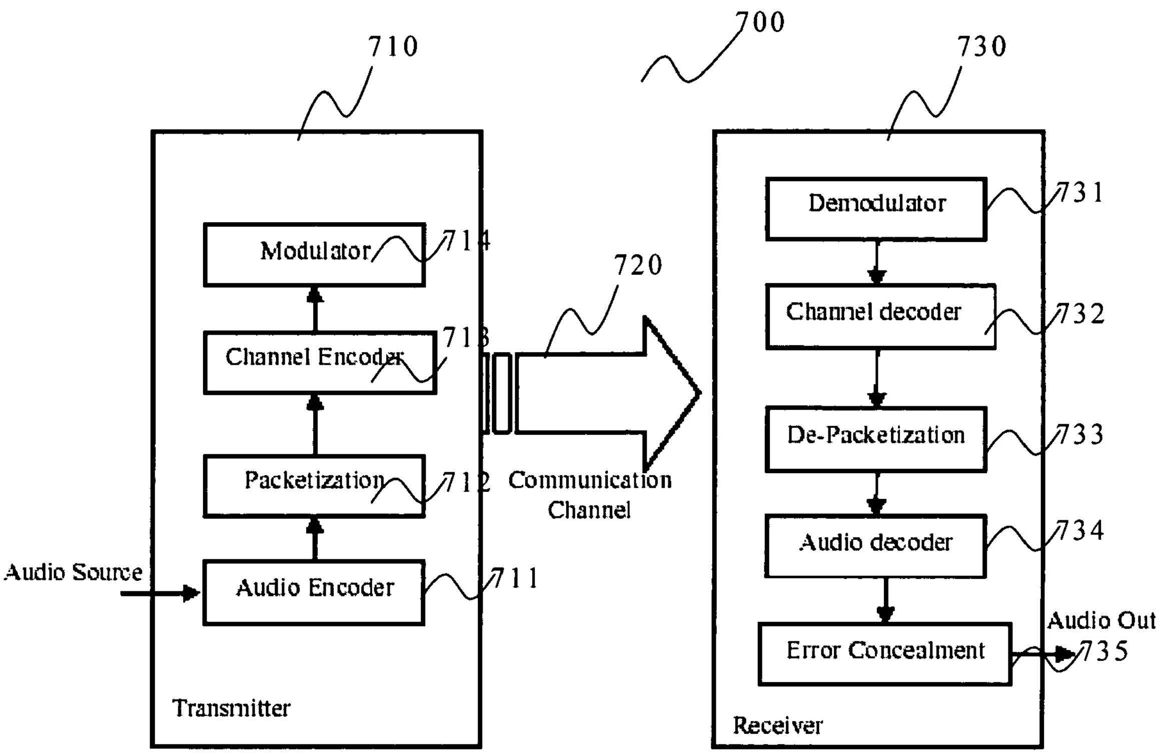
FIG. 7 shows an exemplary multi-band audio streaming system with lost packet concealment feature in accordance with the present invention.

Now referring to FIG. 7, the present invention provides an audio streaming system with the Multi-band Time Expansion algorithm. In one exemplary configuration, the audio streaming system comprises a transmitter 710, a communication channel 720, and a receiver 730. The transmitter 710 includes an audio encoder 711, a packetization means 712, a channel encoder 713, and a modulator 714. The receiver 130 includes a demodulator 731, a channel decoder 732, a de-packetization means 733, a audio decoder 734, and an error concealment module 735. All the components of the audio streaming system 700 are standard items except the error concealment module 135 to be discussed later. For example, the audio encoder 711 may be a source coder for reducing the raw multimedia bit rate. In a preferred embodiment, the source coder is comprised of a plurality of subband source coders, one for every multimedia type. Many subband coders are known and appreciated by those skilled in the art.

Moreover, the packetization is to partition the multimedia data so that the data can be transmitted in packets. Usually, each packet has at least a header and one or more informational fields. Depending on the specific protocol in use, a packet may be of fixed or variable length. The header of a packet contains a field called sequence number. The header of a packet also contains a field describing the number of information fields that it contains and their importance. The channel encoder performs channel coding to accommodate the imperfect or packet losing nature of channels.

Figure 8:
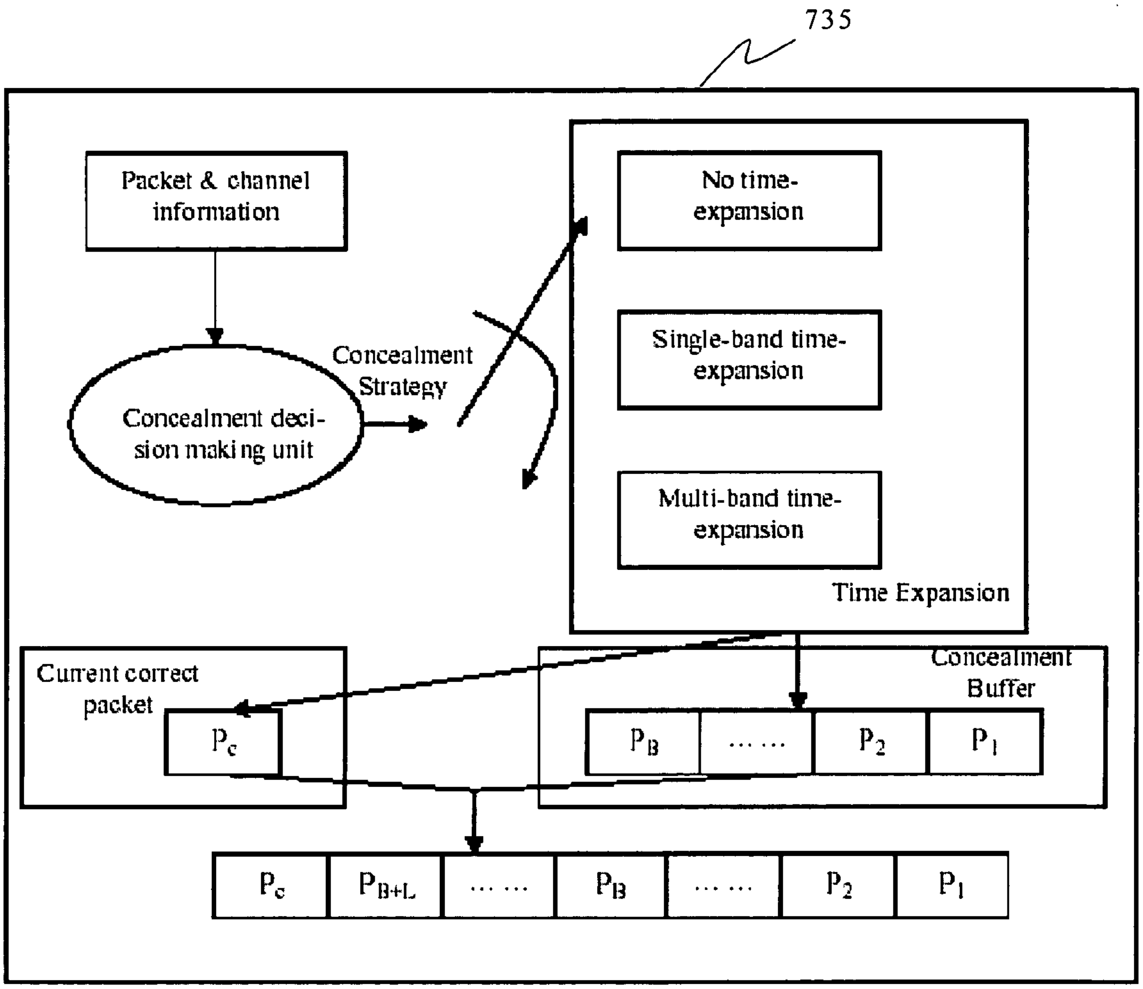
FIG. 8 shows one exemplary configuration of the error concealment within FIG. 7 by incorporating the features of FIG. 5 and FIG. 6.

The error concealment module 735 includes a time-expansion unit with a Multi-band Time Expansion algorithm, a decision-making unit and a packet buffer. The exemplary configuration of the time-expansion unit and the decision-making unit is shown in FIG. 8. The packet buffer within the receiver is operably coupled to receive a sequence of incoming packets from the transmitter. The decision-making unit is operably coupled to the packet buffer. The decision-making unit extracts the sequence number present in the header of every packet and detects, first, whether packets have arrived in order, and, second, the presence of packet loss. When the packets are played, the decision-making unit will instruct the time-expansion unit to conceal any lost packets.

The audio streaming system of the present invention may implement the Multi-band Time Expansion algorithm in embedded systems or computers. The system stores correctly received packets in a buffer, depending on the amount of available memory.

Now there is provided a brief description of the operation of the Lost Packet Concealment in high quality audio streaming applications in accordance with the present invention. The operation comprises the following steps: storing correctly received packets in a buffer, wherein the number of buffered packets can be selected based on the amount of available memory; activating the lost packet concealment algorithm; deciding when to use what time expansion algorithm; and executing the chosen time expansion algorithm. For example, if the multi-band time expansion technique is used to conceal lost packets, the operations as detailed in FIG. 5 are executed. These operations include time expanding the buffered B data packets to length of (B+L)*P+F1; time-expanding the currently received packet to length of (P+F2); merging these two data chunks into one of length (B+L+1)*P using fade-out and fade-in processing. The time expansion operation can be further decomposed into the following steps: separating the incoming signal into different frequency bands; for each signal path, using correlation search to determine best matched positions and stretching the signal with overlap-add method.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

What is claimed is:

1. An apparatus, comprising:

a receiver adapted to receive an audio signal comprising a plurality of packets including a set of B preceding packets correctly received before L lost packets which are not received and a subsequent packet Pc correctly received after the L lost packets;

wherein the receiver includes an error concealment module adapted to conceal existence of the L lost packets in the received audio signal;

wherein the error concealment module includes a time-expansion unit adapted to perform a time scale modification expansion processing operation which stretches a length of the correctly received B preceding packets in the received audio signal and stretches a length of the correctly received subsequent packet Pc in the received audio signal, so that the stretched B and Pc packets combined conceal existence of the L lost packets;

wherein the error concealment module comprises a circuit adapted to frequency separate the audio signal into a first lower frequency band signal and a second higher frequency band signal, and wherein the time-expansion unit performs a first time scale modification expansion processing operation with first expansion parameters on the first lower frequency band signal and performs a second time scale modification expansion processing operation with second expansion parameters on the second higher frequency band signal; and further comprises a circuit adapted to combine results of the first and second time scale modification expansion processing operations.

2. The apparatus of claim 1, wherein the time scale modification expansion processing operation performed by the time-expansion unit accordingly stretches a length of the correctly received B preceding packets and subsequent packet Pc in the received audio signal to a length of (B+L+Pc)*P, where P=packet size.

3. The apparatus of claim 1, wherein the time scale modification expansion processing operation performed by the time-expansion unit stretches the length of the correctly received B preceding packets in the received audio signal to a length of (B+L)*P+F1, where F1=a number of additional samples included for smoothing, where P=packet size.

4. The apparatus of claim 3, wherein the time scale modification expansion processing operation performed by the time-expansion unit further stretches a length of the subsequent packet Pc to a length of Pc+F2, where F2=a number of additional samples included for smoothing.

5. The apparatus of claim 4, wherein the time scale modification expansion processing operation performed by the time-expansion unit accordingly stretches a length of the correctly received B and Pc packets in the received audio signal to a length of (B+L)*P+F1+Pc*P+F2.

6. An apparatus, comprising:

a receiver adapted to receive an audio signal comprising a plurality of packets including a set of B packets correctly received before L lost packets which are not received and a packet Pc correctly received after the L lost packets;

wherein the receiver includes an error concealment module adapted to conceal existence of the L lost packets in the received audio signal;

wherein the error concealment module includes a time-expansion unit adapted to perform a time scale modification expansion processing operation which stretches a length of the correctly received B packets in the received audio signal to a length of at least (B+L)*P, where P=packet size, so as to conceal existence of the L lost packets;

wherein the error concealment module comprises a decision-making unit operable to monitor for the L lost packets; and wherein the decision-making unit implements a process for: selecting a threshold value for using different time-expansion methods; calculating a count_loss parameter for lost packets in the received audio signal; and determining of whether the count_loss parameter is more or less than the threshold value; thereby, if the count_loss parameter is more than the threshold value, separating the audio signal into at least two frequency bands for time scale modification expansion processing by packet length stretching, or if the count_loss parameter is less than the threshold value, leaving the audio signal as a single frequency band for time scale modification expansion processing by packet length stretching.

7. The apparatus of claim 1, wherein the time scale modification expansion processing operation performed by the time-expansion unit further overlap adds, with smoothing, the B preceding packets stretched to the length of at least (B+L)*P to the subsequent packet Pc, where P=packet size.

8. The apparatus of claim 7, wherein the smoothing is provided by a number of additional samples included with either, or both, of the B preceding packets stretched to the length of at least (B+L)*P and the subsequent packet Pc.

9. The apparatus of claim 7, wherein the smoothing is provided by a fade-out and fade-in method.

10. A method for lost packet concealment with respect to an audio signal, comprising:

correctly receiving a set of B preceding packets in an audio signal comprising a plurality of packets;

detecting L lost packets which are not received in the audio signal;

correctly receiving a subsequent packet Pc after the L lost packets;

frequency separating the audio signal into a first lower frequency band signal and a second higher frequency band signal;

performing a time scale modification expansion processing operation which stretches a length of the correctly received B preceding packets in the received audio signal and stretches a length of the correctly received subsequent packet Pc in the received audio signal, so that the stretched B and Pc packets combined conceal existence of the L lost packets, wherein performing a time scale modification comprises:

performing a first time scale modification expansion processing operation with first expansion parameters on the first lower frequency band signal; and performing a second time scale modification expansion processing operation with second expansion parameters on the second higher frequency band signal; and combining results of the first and second time scale modification expansion processing operations.

11. The method of claim 10, wherein performing comprises stretching a length of the correctly received B preceding packets and subsequent packet Pc in the received audio signal to a length of (B+L+Pc)*P, where P=packet size.

12. The method of claim 10, wherein performing comprises stretching the length of the correctly received B preceding packets in the received audio signal to a length of (B+L)*P+F1, where F1=a number of additional samples included for smoothing, where P=packet size.

13. The method of claim 12, wherein performing further comprises stretching a length of the subsequent packet Pc to a length of Pc+F2, where F2=a number of additional samples included for smoothing.

14. The method of claim 13, performing accordingly stretches a length of the correctly received B and Pc packets in the received audio signal to a length of (B+L)*P+F1+Pc*P+F2.

15. A method for lost packet concealment with respect to an audio signal, said method comprising:

correctly receiving a set of B packets in an audio signal comprising a plurality of packets;

detecting L lost packets which are not received in the audio signal; correctly receiving a packet Pc after the L lost packets;

performing a time scale modification expansion processing operation which stretches a length of the correctly received B packets in the received audio signal to a length of at least (B+L)*P, where P=packet size, so as to conceal existence of the L lost packets;

wherein detecting the L lost packets comprises monitoring for the L lost packets by:

selecting a threshold value for using different time-expansion methods;

calculating a count_loss parameter for lost packets in the received audio signal; and determining of whether the count_loss parameter is more or less than the threshold value;

thereby, if the count_loss parameter is more than the threshold value, separating the audio signal into at least two frequency bands for time scale modification expansion processing by packet length stretching, or if the count_loss parameter is less than the threshold value, leaving the audio signal as a single frequency band for time scale modification expansion processing by packet length stretching.

16. The method of claim 10, wherein performing further comprises overlap adding, with smoothing, the B preceding packets stretched to the length of at least (B+L)*P to the subsequent packet Pc.

17. The method of claim 16, wherein the smoothing is provided by including a number of additional samples included with either, or both, of the B preceding packets stretched to the length of at least (B+L)*P and the subsequent packet Pc.

18. The method of claim 16, wherein the smoothing is provided by a fade-out and fade-in method.

19. An apparatus, comprising:

a receiver adapted to receive an audio signal comprising a plurality of packets including at least one packet correctly received preceding at least one lost packet and at least one packet correctly received subsequent to said at least one lost packet;

wherein the receiver includes an error concealment module operable to perform time scale modification expansion processing that stretches a length of the at least one correctly received preceding packet and stretches a length of the at least one correctly received subsequent packet so that the stretched packets when combined conceal existence of the at least one lost packet;

said time scale modification expansion processing being configured to frequency separate the audio signal into a first lower frequency band signal and a second higher frequency band signal, perform a first time scale modification expansion processing operation with first expansion parameters on the first lower frequency band signal, perform a second time scale modification expansion processing operation with second expansion parameters on the second higher frequency band signal, and combine results of the first and second time scale modification expansion processing operations.

20. A method for lost packet concealment with respect to an audio signal, said method comprising:

receiving an audio signal comprising a plurality of packets including at least one packet correctly received preceding at least one lost packet and at least one packet correctly received after said at least one lost packet;

performing time scale modification expansion processing that stretches a length of the at least one correctly received preceding packet and stretches a length of the at least one correctly received subsequent packet so that the stretched packets when combined conceal existence of the at least one lost packet;

said time scale modification expansion processing comprising:

frequency separating the audio signal into a first lower frequency band signal and a second higher frequency band signal;

performing a first time scale modification expansion processing operation with first expansion parameters on the first lower frequency band signal;

performing a second time scale modification expansion processing operation with second expansion parameters on the second higher frequency band signal; and combining results of the first and second time scale modification expansion processing operations.

* * * * *